Aug. 11, 1931.  P. P. HORNI  1,818,330
SELF STARTING SYNCHRONOUS MOTOR
Filed Dec. 24, 1927   3 Sheets-Sheet 1
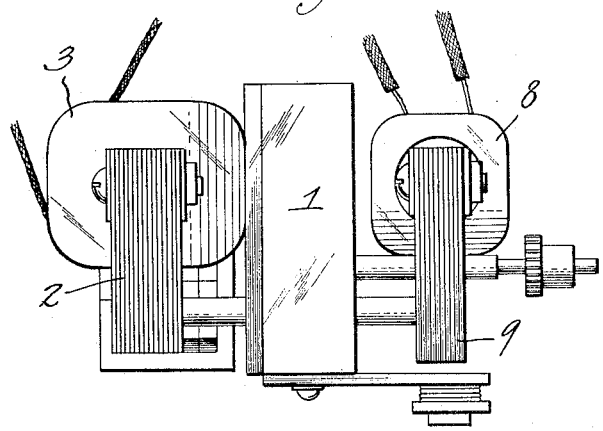
 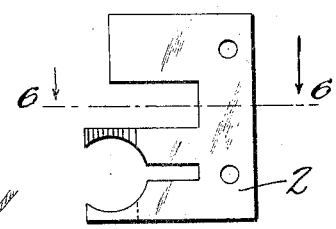
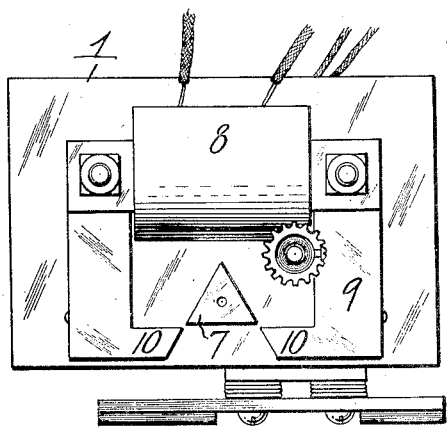
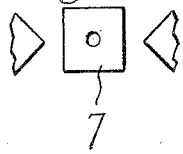   
INVENTOR
Paul P. Horni
BY
Knight Bros.
ATTORNEYS

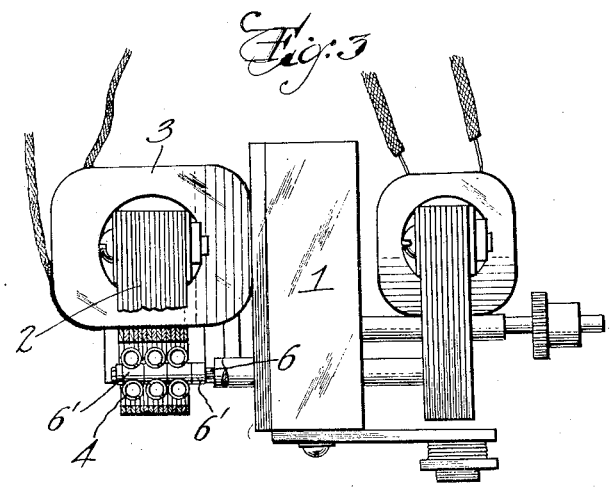
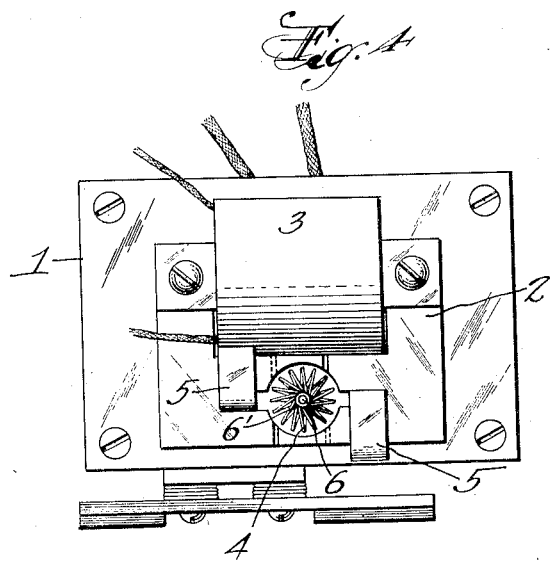

Aug. 11, 1931.  P. P. HORNI  1,818,330
SELF STARTING SYNCHRONOUS MOTOR
Filed Dec. 24, 1927   3 Sheets-Sheet 3
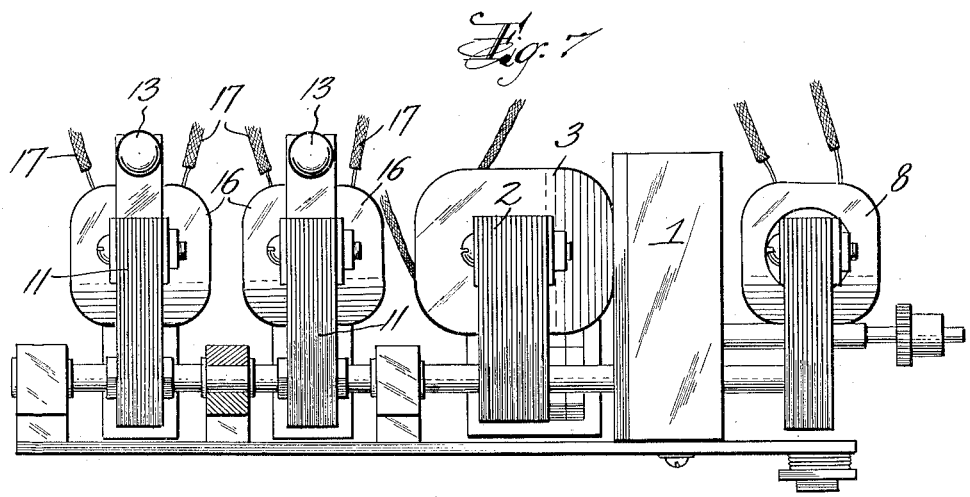
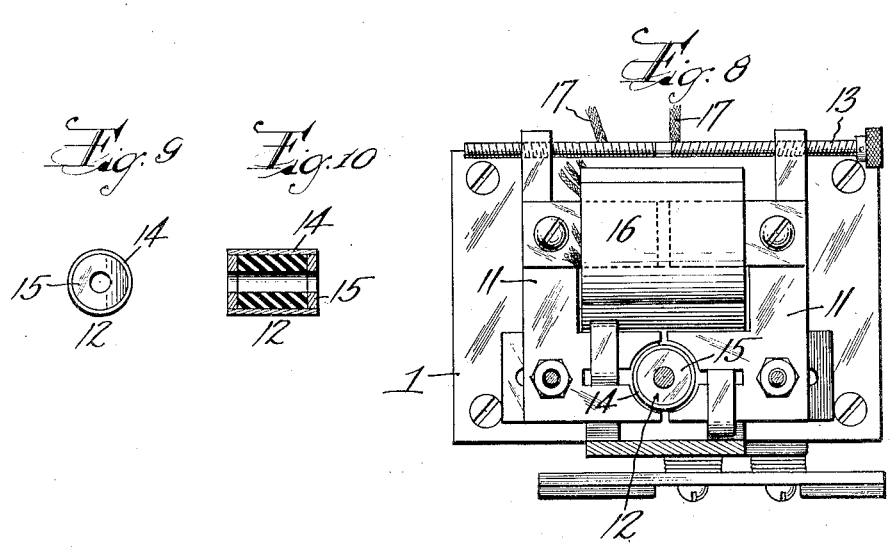
INVENTOR
Paul P. Horni
BY
Knight Bros
ATTORNEYS Patented Aug. 11, 1931

1,818,330

UNITED STATES PATENT OFFICE

PAUL P. HORNI, OF NEWARK, NEW JERSEY

SELF-STARTING SYNCHRONOUS MOTOR

Application filed December 24, 1927. Serial No. 242,447.

This invention relates to alternating current motors of the induction type, such for example as are useful in the operation of traffic signals, in connection with public service alternating current supply.

The object of the invention is to produce an induction motor that will have a strong starting torque combined with a strong torque at synchronism. It is known that there is a certain amount of incompatability between these two objects for when a rotor is designed to have a strong tendency to run at synchronism, such a rotor will in general not be self-starting and conversely when the rotor is designed to have a strong starting torque, it will not have characteristics that will give it a strong tendency to run at synchronism. I have found a solution of the problem can best be accomplished by not trying to produce both effects with one rotor running in one field but to use two rotors running in separate fields of different character, one field having the usual rotating field characteristic with a simple induction rotor for powerful self-starting and the other field having a non-rotating field characteristic with a rotor that will because of certain diameters being accentuated magnetically have a powerful and absolutely accurate synchronizing effect. The former then becomes a driving element and the latter a regulating element, the driving element will not of itself run in exact synchronism and the regulating element will not start itself but both being coupled to the same shaft they will produce in a most satisfactory manner the combined function of strong self-starting and strong synchronism.

A further purpose of the invention is to produce a self-starting induction motor that can be run either at the cycle speed of the current or at various other predetermined exact fractions of said cycle speed. I have found that by using rotors of various geometric shapes such additional changes of speed ratios as for example two-thirds, one-half, two-fifths and one-third, or other fixed fractional speeds, can be obtained.

A further object of the invention is to produce a self-starting motor of the induction type, of simple and cheap construction that contains adjusting means whereby the speed may be adjusted at any different predetermined speeds, and I accomplish this by coupling with a self-starting motor of the induction type one or more smaller induction motors designed to have a tendency to turn in opposition to that of the first induction motor so as to act as a definite speed brake on the first induction motor holding the same to a definite velocity.

A further object of the invention is to provide means for varying the braking strength of said braking motors so that the speed of the primary induction motor may be thus regulated. Such adjustable braking motors on the shaft of the main induction motor may have their circuits controlled from a distance and thus furnish a means of giving various definite speeds to a distant motor by operations dictated from a master controller at a central point.

Other objects of the invention will appear from the following description made in connection with the accompanying drawings, in which Figure 1 is a plan view of a self-starting synchronously running induction motor.

Figure 2 is an end view looking towards the synchronizing side.

Figure 3 is a view similar to Figure 1 but with the field pole of the induction starting motor cut away to show the rotor in section.

Figure 4 is an end view looking towards the starting motor side.

Figure 5 is a detail of a field lamination.

Figure 6 shows a section of the field laminations assembled, taken on line 6—6 of Figure 5.

Figure 7 is a plan view of the motor combined with two braking motors.

Figure 8 is an end view of one of the braking motors.

Figure 9 is an end view and

Figure 10 an axial section of a rotor suitable for use in the braking motor.

Figures 11, 12, 13 and 14 show other shapes that the rotor of the synchronizing element may take.

Referring to the drawings, 1 represents a suitable supporting frame which may, for example, be a gear reduction case. Attached to this frame is a field magnet core 2 of a self-starting induction motor, having a coil 3 and a rotor 4. The laminæ forming the core may be of the shape shown in Figure 5 and be assembled as shown in Figure 6 with scarfed polar extensions on one pole adapted to come within close proximity of oppositely scarfed polar extensions on the other pole. The poles are split by a slot and around two diagonally opposite polar parts magnetic retarding bands of copper 5 are placed so as to constitute a rotating magnetic field in a manner well understood in the art. The self-starting rotor shown in end view in Figure 4 and in axial section in Figure 3 comprises a helix of iron wire bent in the form of a toroid around a central brass tube 6' mounted on a shaft 6. There may be several of these toroids mounted side by side on the shaft. A rotor of this character has a strong self-starting torque and is extremely light. The rotor 4 may consist of a plurality of toroids, as shown in Figure 3. Mounted on the same shaft 6 is a second rotor 7 turnable in the field of a second magnet 8 which has the usual core 9 with no shaded pole pieces and it therefore produces a field that is not rotating. The rotor 7 may be of polygonal shape, as shown in Figure 2. In this instance a triangular shape is illustrated and I prefer to set it with its axis to one side of the medium line of the polar faces between which it revolves. With such a field magnet and such a polygonal rotor, the rotor will not of course be self-starting but it will have a strong tendency to hold the rotor at a fixed relation to the cycle speed of the exciting current, thus regulating the propelling power of the rotor 4. By pointing the poles 10 of the non-rotating field core 9 and arranging the triangular rotor so that its facets will come in line with said points, the tendency to fixed speed is made very powerful. The rotor 7 may take either the triangular shape shown in Figure 2, in which case its fixed speed will correspond to two-thirds of the cycle speed of the exciting current. If, however, the synchronous rotor has a square form, as shown in Figure 11, and is placed with its axis in the medium line of the magnetic flux, the speed will be one-half the cycle speed of the exciting current. A hexagonal form, as shown in Figure 12, also located in the medium line of the flux, will give a speed of one-third of the cycle speed. A pentagonal form, as shown in Figure 13 in line with the magnetic flux, will give a speed of two-fifths of the cycle speed, while a diamond shape, as shown in Figure 14, placed in line with the magnetic flux, will give a speed exactly in synchronism with the cycle speed.

It will thus be seen that by varying the shape of the rotor 7 or by varying its location with reference to the magnetic poles, I can produce numerous different speeds, each of which will bear a definite fractional relation to the cycle speed of the current. When the polygonal rotor has an even number of sides, the axis is placed in line with the salient angles of the poles and when the number of sides is odd, the axis must be placed to one side of the line joining the polar angles. This is for the purpose of having the opposite apices of the polygonal rotor simultaneously presented to the salient poles, the result of which is to give a strong and accurate synchronous characteristic. Such rotor and field pole construction, owing to its extreme simplicity, is particularly favorable to the manufacture of small synchronous motors having great power for their size. The power thus developed is due to the fact that the induction rotor is doing all the work, the synchronizing element being only used as a regulating brake holding the rotating ensemble down to synchronism. The synchronism may be, of course, any sub-multiple of the current cycle or in exact synchronism therewith.

From the construction just described, it will be seen that the induction rotor 4 will give a strong starting torque to the shaft 6 and that when the rotor 7 reaches its characteristic speed, the propelling force of the induction rotor 4 will be held in check at that speed. To give additional fixed speeds not bearing particular fractional relation to the cycle speed, I may employ the braking device illustrated in Figure 8. Here a shaded pole field core 11 is made in two halves adjustable with respect to each other and to the rotor 12 by an adjusting screw 13. The rotor may in this case be a plain induction armature, as shown in Figures 9 and 10, in which an iron cylinder 14 has copper end disks 15 for mounting it on the shaft. When such a device has its armature mounted on the shaft of the propelling induction rotor 4, as shown in Figure 7, and the shrouded pole pieces are reversed with respect to the pole pieces of the propelling motor, the device will act as a brake and depending upon the torque characteristics of the two rotors and their respective fields the resultant speed will be something less than the cycle speed and will be fixed so long as there is no change in the adjustments. The said fixed speed may be changed to some other fixed speed by turning the screw 13. When the screw is turned so as to draw the poles closer, the resultant speed will be lower. In Figure 7 I have shown two such braking motors connected to the same propelling motor and in like manner there may be any number of such brakes, each adjusted for a different fixed speed. The coils 16 of these braking devices may have their terminals 17 connected to any circuit controlling devices either near-by or at a distant point of control and they therefore provide a means of selecting various speeds of operation from a distance.

I claim:

1. The combination comprising a means of producing a rotating magnetic field, a self-starting rotor turnable in said field, a separate means for producing a rotary magnetic field, an induction rotor connected to said self-starting rotor and having a tendency to turn in such separate field in the reverse direction to the self-starting rotor, the torque of the rotor in the separate field being adjusted to act as a brake on the other rotor and hold it at a definite speed.

2. A combination according to claim 1, characterized by the use of a plurality of braking rotors coupled to the self-starting induction rotor, said braking rotors having different torque characteristics so as to serve as means for holding the self-starting rotor at different definite speeds.

3. A combination according to claim 1, in which there are a plurality of braking rotors having various torque characteristics coupled to the self-starting rotor with a synchronous rotor and accompanying non-rotating field magnet also coupled to the said rotors.

PAUL P. HORNI.